(No Model.)

F. H. BOLTE.
HAY CARRIER.

No. 276,556. Patented May 1, 1883.

Witnesses:
E. G. Asmus
Wm. J. Sinnott

Inventor:
Frank H. Bolte
By Jas. B. Erwin
Attorney.

UNITED STATES PATENT OFFICE.

FRANK H. BOLTE, OF MILWAUKEE, WISCONSIN, ASSIGNOR TO THE EGEL-HOFF MANUFACTURING COMPANY, OF SAME PLACE.

HAY-CARRIER.

SPECIFICATION forming part of Letters Patent No. 276,556, dated May 1, 1883.

Application filed December 9, 1882. (No model.)

*To all whom it may concern:*

Be it known that I, FRANK H. BOLTE, a citizen of the United States, residing at Milwaukee, in the county of Milwaukee and State of Wisconsin, have invented certain new and useful Improvements in Hay-Carriers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
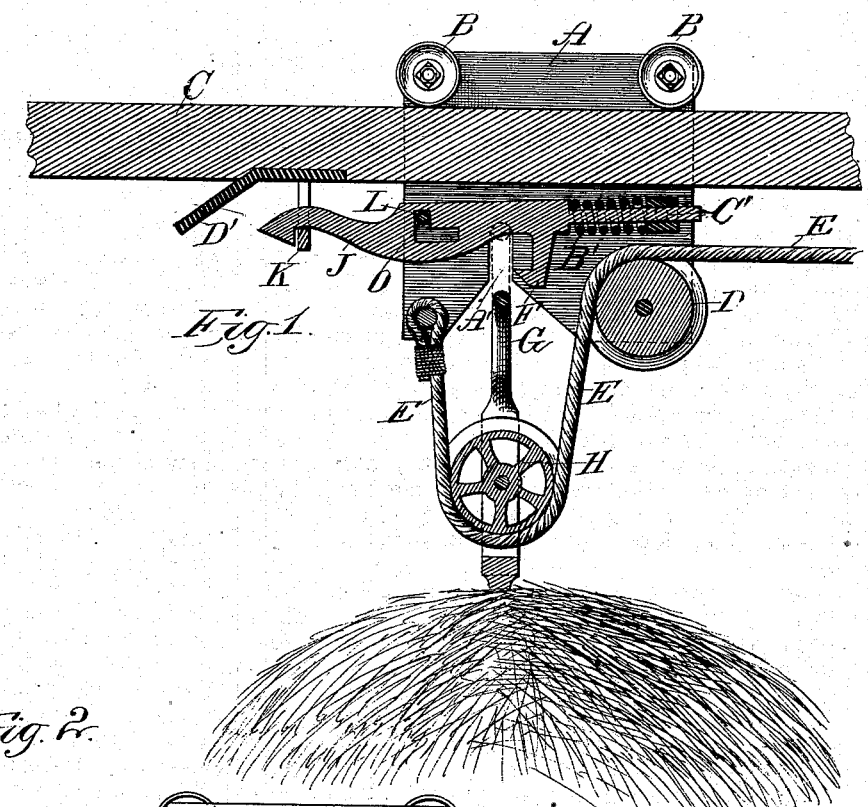
Figure 2:
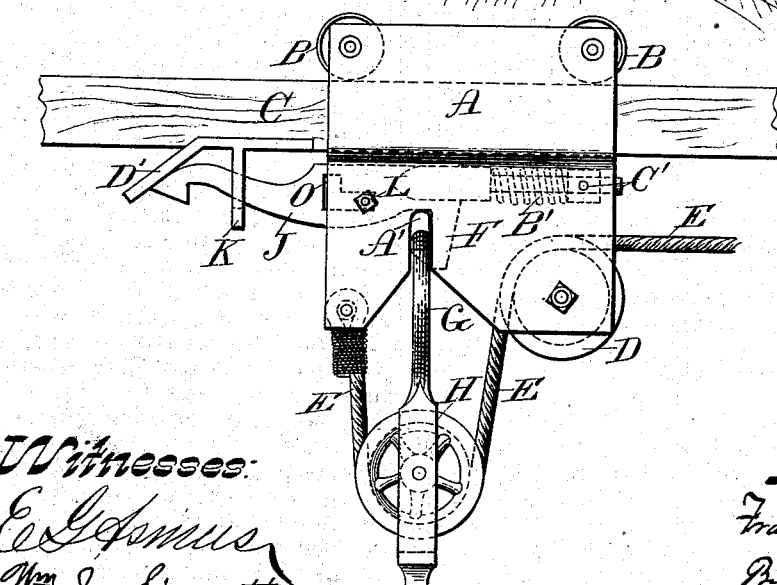

Figure 1 represents a side view of the carrier retained by a latch in a fixed position above the load as the fork and hay are elevated therefrom preparatory to the bail engaging upon the supporting-hook. Fig. 2 shows the position of the retaining-latch in the act of disengaging the bail from the supporting-hook.

A is a substantial frame.

B B are wheels which are adapted to roll upon the supporting-track C.

D is a pulley over which the rope E is drawn as the load is elevated.

F is a rigid hook by which the fork and hay are suspended while being drawn forward over the place of deposit.

G is a bail which is connected with the pulley-block H. The bail G is adapted, as it is drawn upward, to enter the recess A', when the hook F is thrown backward by contact with the bale until the bail enters above said hook, when said hook is thrown forward by the spring B' beneath the bail, and thus supports the fork when the rope E is slackened.

J is the latch which retains the carrier in a fixed position while the fork and hay are being elevated, thus preventing the carrier from being drawn forward by the forward draft upon the rope. The latch J and hooks F and M are formed in a single piece.

K is the retaining-bracket, which is rigidly attached to the track C. The latch J is supported in the frame A upon pin L and block C', which supports permit the forward end of said latch to rise and fall as it enters the bracket K, and also to be thrown back against the spring B as the forward end of said latch is brought in contact with the angular stop D'. The latch J is also provided with an angular slot, O, which, when said latch is thrown backward, permits the front end of said latch to be thrown down in contact with the retaining-bracket K.

My carrier operates as follows: The hay-fork being loaded and suspended from the lower end of the block H, and the carrier being retained by the latch J and bracket K, as mentioned, the fork is raised by drawing upon the rope until the bail G is brought in contact with the convex surface of the hook F, whereby the latch J and hook F are thrown backward and the bail is allowed to pass above the hook F, when said hook and latch are thrown forward by said spring B, thus bringing said hook beneath the bail. The bail having thus passed above said hook, it is brought in contact with hook M, whereby said latch is disengaged from said bracket and the carrier released. The carrier, being thus released, is drawn back over the stack or other place of deposit by the continued backward movement of the rope. When the load is brought above the place of deposit and the rope E slackened, the bail drops upon the hook F, which thus retains the fork and pulley-block until the hay is disengaged therefrom. The rope E being slackened, the carrier is drawn forward to the place of loading in the ordinary manner, when the hook M passes through said bracket K until its front end strikes against the bracket D', which arrests the forward movement of the latch, whereby, as the carrier moves on, the pin L is brought beneath the vertical part of the slot O, thus permitting the front end of said latch to be moved downward as it moves forward against the lower inclined surface of the bracket D, whereby said hook F is disengaged from said bail, when the fork may be withdrawn and reloaded.

I am aware that hay-carriers have previously been provided with a latch adapted to support the bail of the pulley-block, as shown in Patents No. 243,600 and No. 268,813. I therefore make no claim to the peculiar form of latch or carrier therein shown and described.

Having thus described my invention, what I claim as new, and desire to secure by Letters Patent, is—

1. The combination of frame A, provided with the latch-supports L and C, latch J, and spring B', said latch being provided with hooks K and F and angular slot O, said spring being adapted to hold said latch forward when supporting the bale, said pin L and angular slot being adapted to retain said latch backward and downward when engaged in bracket K, substantially as and for the purpose specified.

2. In devices for unloading hay, consisting in the combination and arrangement of the track C, provided with angular stop D' and vertical bracket K, the bracket K being provided with an opening for the reception of latch J, frame A, adapted to roll on said track, horizontally-moving latch J, provided with angular slot O, downward-acting hook M, and hook F, said latch being provided with a spring, B', which is adapted to throw said latch J forward when released from pin L, said stop D' being adapted to throw the forward end of said latch J downward and backward against said spring, said pin L being adapted to rigidly retain said latch in its backward position against said spring, and said hook M in contact with said bracket K as the fork is elevated, all substantially as and for the purpose set forth.

In testimony whereof I affix my signature in presence of two witnesses.

FRANK H. BOLTE.

Witnesses:
JAS. B. ERWIN,
GEO. EGELHOFF.